US009381725B2

(12) United States Patent
Gastel

(10) Patent No.: US 9,381,725 B2
(45) Date of Patent: Jul. 5, 2016

(54) METHOD FOR PRODUCING AN ADJUSTMENT SPACER

(71) Applicant: Daniel Andre Gastel, Plaisir les Gatines (FR)

(72) Inventor: Daniel Andre Gastel, Plaisir les Gatines (FR)

( * ) Notice: Subject to any disclaimer, the term of this patent is extended or adjusted under 35 U.S.C. 154(b) by 0 days.

(21) Appl. No.: 14/401,904

(22) PCT Filed: Apr. 30, 2013

(86) PCT No.: PCT/FR2013/050953
§ 371 (c)(1),
(2) Date: Nov. 18, 2014

(87) PCT Pub. No.: WO2013/171395
PCT Pub. Date: Nov. 21, 2013

(65) Prior Publication Data
US 2015/0140339 A1    May 21, 2015

(30) Foreign Application Priority Data

May 18, 2012  (FR) ...................................... 12 54561

(51) Int. Cl.
| | | |
|---|---|---|
| *B32B 37/00* | (2006.01) | |
| *B32B 37/06* | (2006.01) | |
| *B32B 7/12* | (2006.01) | |
| *B32B 15/04* | (2006.01) | |
| *B32B 37/24* | (2006.01) | |
| *B32B 7/06* | (2006.01) | |
| *F16B 43/00* | (2006.01) | |

(52) U.S. Cl.
CPC . *B32B 37/06* (2013.01); *B32B 7/06* (2013.01); *B32B 7/12* (2013.01); *B32B 15/043* (2013.01); *B32B 37/24* (2013.01); *F16B 43/00* (2013.01); *B32B 2037/243* (2013.01); *B32B 2255/06* (2013.01); *B32B 2255/26* (2013.01); *B32B 2309/02* (2013.01); *B32B 2310/0454* (2013.01); *Y10T 156/10* (2015.01); *Y10T 428/31522* (2015.04)

(58) Field of Classification Search
CPC .... B32B 43/006; B32B 15/043; B32B 37/06; B32B 37/065; B32B 2307/148; B32B 37/24; B32B 38/10; Y10T 156/11; Y10T 156/1153; Y10T 156/1163; B29C 65/4835; B29C 66/742; B23K 20/04
USPC ............ 156/247, 307.5, 307.7, 701, 711, 713
See application file for complete search history.

(56) References Cited

U.S. PATENT DOCUMENTS

| | | | | | |
|---|---|---|---|---|---|
| 3,211,091 | A | * | 10/1965 | Garrett ...................... | B41C 3/00 101/401.1 |
| 3,773,601 | A | * | 11/1973 | Steffa ...................... | B23P 19/02 101/459 |
| 4,684,429 | A | * | 8/1987 | Dalton, Jr. ............... | B41N 1/06 101/395 |
| 8,518,839 | B2 | | 8/2013 | Gastel | |
| 2008/0081141 | A1 | | 4/2008 | Gastel | |

FOREIGN PATENT DOCUMENTS

| | | |
|---|---|---|
| EP | 0667233 A1 | 8/1995 |
| GB | 562795 A | 7/1944 |

OTHER PUBLICATIONS

European Patent Office; International Search Report in International Patent Application No. PCT/FR2013/050953 (Jul. 16, 2013).

* cited by examiner

*Primary Examiner* — John Goff
(74) *Attorney, Agent, or Firm* — Leydig, Voit & Mayer, Ltd.

(57) ABSTRACT

A method for producing an adjustment shim includes preparing a liquid solution of a non-polymerized resin and a solvent; coating sheets of metal with the liquid solution so as to form a film of resin on at least one face of each of the sheets of metal; stacking the metal sheets so that two adjacent sheets of metal are separated by the film of resin; and curing the resin films in the stack of metal sheets, for a predefined time period, at a temperature higher than a degradation or burning temperature of the resin.

11 Claims, No Drawings

METHOD FOR PRODUCING AN ADJUSTMENT SPACER

FIELD OF THE INVENTION

The invention generally relates to laminated products having an adjustable thickness by disintegration, to the methods for manufacturing such products, and to their application as adjustment shims for mechanical assemblies.

BACKGROUND

A laminated product having an adjustable thickness by disintegration comprises an alternating stack of sheets and layers of an adhesive material. Each sheet has an intrinsic tearing strength and each adhesive material layer connects to each other two adjacent sheets of the stack with a weaker binding force than the tearing strength of the sheets, the result of which is that each sheet may be detached from the stack without being torn. These materials, so-called peelable materials, are widely used as thickness shims in complex mechanical assemblies. These assemblies may include several hundred, or even several thousand parts, each having dimensional tolerances. The sum of the tolerances generates plays which may in certain cases be considerable, of several millimeters, which need to be compensated in order to allow the mechanical assemblies to properly ensure their functions.

For this, adjustment shims, most often peelable shims, in metal materials or in polymers are used. These peelable shims consists of thin laminae, forming sheets, superposed and adhered together so as to form more or less significant thicknesses, and machined so as to be adapted to the outer contour of the members to be adjusted. The adjustment is made by reducing the thickness of the shim by peeling one or more of these laminae and by inserting the shim at the location where play was ascertained.

Products of this type are taught in document FR2831095, and are notably used as adjustment shims for mechanical assemblies.

However, in the case of adjustment shims made from metal sheets, the disintegration of said metal sheets of the adjustment shim requires a cutting tool, such as a scalpel or a cutter, in order to be able to break the polymers of the resin which form the binding material layers. Such a disintegration operation of an adjustment shim has two drawbacks:

the operation takes a long time to be carried out, slowing down by as much the rates for assembling elements requiring such adjustment shims; and
there is a strong risk of an accident for the operator handling the cutting tool being used for the disintegration operation for the adjustment shim

SUMMARY OF THE INVENTION

An object of the invention is to provide a metal adjustment shim for which disintegration is rapid and secured.

For this purpose, according to the invention, a method is provided for manufacturing an adjustment shim comprising steps for:

preparing a liquid solution comprising a non-polymerized resin and an abundance of solvents;
coating several metal sheets with the liquid solution so as to form a resin film on at least one face of the sheet;
stacking metal sheets so that two adjacent metal sheets are separated by the resin film; and
curing during which the previously produced stack of metal sheets is subjected, for a predefined period, to a temperature, of which one value is greater than a value of the degradation or burning temperature of the resin.

Thus, the fact of curing the resin located between the metal sheets at a temperature greater than a degradation temperature of said resin gives the possibility of sufficiently weakening the cohesion force produced between the metal sheets in order to allow simple, fast and secured disintegration, since without any tool, while ensuring cohesion of the stack during manipulations and operations which the stack may undergo following this curing step.

Advantageously, but optionally, the previous manufacturing method includes at least one of the following features:

prior to the curing step, the manufacturing method comprises a step during which the resin is brought to a polymerization state;
said polymerization state of the resin is a final polymerization state;
in order to polymerize the resin, the latter is subject to a temperature comprised between 170° C. and 180° C.;
in order to prepare the liquid solution, the solvent is added in a greater proportion than 20% of the solution so as to disperse the resin in order to obtain an infinitesimal thickness of the resin film;
for preparing the liquid solution, the solvent is added in a proportion of less than or equal to 40% of the solution;
the resin is a resin of the type belonging to the family of thermosetting resins;
the method further includes a step for roughening the shim before the curing step;
during the curing step, a value of the predefined period is three hours;
during the curing step, the value of the temperature is greater than 260° C., the resin being an epoxy resin; and,
the value of the temperature is greater than or equal to 300° C.

Provision is also made according to the invention for a metal adjustment shim manufactured according to the manufacturing method having at least one of the previous features.

Advantageously, but optionally, the adjustment shim further has the following feature:

upon disintegration, the peeled metal sheets are reusable.

Other features and advantages of the invention will become clearly apparent from the description which is made thereof below, as an indication and by no means as a limitation, from an embodiment and from an alternative.

DETAILED DESCRIPTION

An adjustment shim comprises several superposed sheets. The sheets are metal, such as steel, preferably stainless steel, or aluminium, or further in any type of metal which may be shaped into sheets in order to produce an adjustment shim, selected for their compressive strength in order to guarantee a constant sheet thickness, for their tensile strength with a view to guaranteeing high tearing strength, and for their compatibility with the other construction materials of the assembly in which a thickness shim is required to be used.

The sheets are coated with a resin, for which final polymerization is carried out while maintaining the sheets clasped against each other, and may:

maintain the sheets bound together with a sufficiently high adherence force in order to ensure sufficient cohesion of the laminated product and sufficiently low for allowing intentional detachment of the sheets one-by-one, without any tearing, in other words, maintaining or detaching each sheet in its entirety. Thus, the detachment of each sheet guarantees a thickness reduction equal to the thickness of one sheet. An initial number of sheets gives a known initial thickness; a final number of sheets gives a final thickness which may be determined accurately.

providing a certain shear strength between the sheets. This shear strength, by opposing the sliding of the sheets relatively on each other, in combination with the tensile strength of the metal of the sheet, opposes bending of the laminated product in order to guarantee perfect flatness. Indeed, a lack of flatness would cause deviations between the tops of the curves which would go beyond the thickness obtained by accumulation of the thicknesses of the sheets.

In order to obtain such a result, a method for manufacturing an adjustment shim for securing a second part on a first part is described.

In a first step, a liquid solution comprising a non-polymerized resin, to which an abundance of solvent is added, is prepared. The amounts of solvent usually added, generally vary from 15 to 20% for facilitating coating of the sheets with inking rollers as in an offset printing machine, by spraying or by soaking in a bath. Overabundance occurs as soon as the solvent is added in a proportion greater than 20% of the solution with the effect of dispersing the resin. In order to obtain a more consequent dispersion of the resin, it is possible to reach up to 40% without any penalty on the future polymerization of the resin. It is possible to slightly exceed the upper value in order to take into account the evaporation of the solvent before the following steps, notably before the polymerization step. This type of solvent is adapted to the resin. Acetone proves to be a highly efficient solvent, notably for a resin belonging to the family of thermosetting resins, such as more particularly epoxy resins. In order to find a remedy to the inconvenience of acetone vapors, it is possible to use other solvents or to work under an extractor hood. For resins belonging to the family of thermoplastics, adapted solvents as recommended by resin providers may be used.

In a second step, several metal sheets are coated with the liquid solution obtained in the previous step so as to form a film of resin on at least one sheet face, for example with an inking roller or on both faces by soaking. As indicated above, several types of metal are suitable depending on the expected use, notably from among stainless steels for their strength over time and their excellent surface property, including a surface as smooth as possible, may be required. The strong resin dispersion in the solvent-rich solution gives the possibility of obtaining an infinitesimal thickness of resin film on the sheets, which may be reduced to a molecular scale, of the monomers or oligomers making up the resin, just sufficient for allowing subsequent polymerization.

In a third step, the sheets are stacked to which a last non-coated sheet is optionally superposed on a free coated face of the previous sheet. In this way, the sheets are separated from each other by a resin film forming the binding material layer. The sheets are then pressed against each other, promoting discharge of a possible residual excess of the liquid solution so that the faces facing both successive metal sheets are very close to each other.

In a fourth step, the resin is brought to a polymerization state which gives the shim a cohesion force between sheets having a modulus which is greater than a minimum value for maintaining the rigid shim in a plane. This modulus may, in certain cases, be obtained with a partial polymerization state. A total polymerization state, by increasing the cohesion force, reinforces the planar rigidity of the shim.

The degree of polymerization is selected for obtaining a component of the cohesion force which is perpendicular to the plane, of less than a maximum value which allows the peeling of one of the sheets to which is applied a separation force greater than the maximum value. The small thickness of the resin film gives the possibility of boosting the degree of polymerization up to a total polymerization state by maintaining the component perpendicular to the maximum value which allows peeling of one of the sheets to which is applied a separation force greater than the maximum value. The advantage of the total or final polymerization state is being stable and thus retaining its properties over time.

This is why a final polymerization state is preferred, in which the total polymerization of the resin provides good stability. In order to totally polymerize the resin when it is of the type belonging to the family of thermosetting resins, the shim, or more generally, the laminated product obtained by the previous steps, is subject to a temperature comprised between 170° C. and 180° C., in a furnace or an oven. The period for maintaining temperature varies from 1 to 7 hours according to the type of resin used.

Once the polymerization step is completed, the adjustment shim is roughened by machining and/or trimming in a fifth step. However, the disintegration of such a thereby obtained adjustment shim requires the use of a cutting tool of the scalpel or cutter type, which does not allow simple, fast, and secured disintegration.

For this, a sixth step, a so-called curing step, is carried out. In this step, the adjustment shim, once roughened, is again subject, in a furnace or an oven to a temperature above the degradation or burning temperature of the resin for a predefined period. For example in the case of the use of epoxy resin, the temperature used is greater than 210° C. and the duration is of about 3 hours. Preferentially, the temperature used is greater than or equal to 220° C. Still preferentially, the temperature used is greater than or equal to 240° C. Still preferentially, the temperature used is greater than or equal to 260° C. Still preferentially, the temperature used is greater than or equal to 270° C. Still preferentially, the temperature used is greater than or equal to 280° C. Still preferentially, the temperature used is greater than or equal to 300° C.

In an alternative embodiment, the roughened adjustment shim is packaged beforehand in an aluminium sheet, of the domestic type, for example, before being replaced in the furnace or oven.

After this sixth step, it was seen that the integrity of the adjustment shim is not modified. Indeed, the latter may be manipulated without having to change the habits in this field. This means that, in spite of a temperature greater than the degradation or burning temperature of the resin, there remains a sufficient amount of binding material between the sheets forming the adjustment shim so as to maintain them sufficiently together so as to allow any handling on an assembling location, for example. Upon use, in order to allow disintegration of the thereby produced adjustment shim, it is sufficient to apply a short blow on a portion of an edge of the adjustment shim, like a simple blow on the corner of a workshop table, in order to initiate disintegration, the stacked sheets of the adjustment shim then forming a fan at the portion of the edge of the shim having received the short blow. Consequently, the operator just has to remove by hand, without any tool, the number of required sheets for obtaining the desired thickness. This allows simple, rapid, and secured disintegration of the thereby produced adjustment shim.

In an alternative embodiment of the invention, the fourth step during which the resin forming the binding material layers of the laminated product or of the adjustment shim is polymerized and replaced with a step similar to the sixth step described earlier. The laminated product or the adjustment shim is subject, in a furnace or an oven, to a temperature above the degradation or burning temperature of the resin for a predefined time. For example, in the case of the use of epoxy resin, the temperature used is greater than 210° C. and the duration is of about 3 h. Preferentially, the temperature used is greater than or equal to 220° C. Still preferentially, the temperature used is greater than or equal to 240° C., still preferentially, the temperature used is greater than or equal to 260° C. Still preferentially, the temperature used is greater than or equal to 270° C. Still preferentially, the temperature used is greater than or equal to 280° C. Still preferentially, the temperature used is greater than or equal to 300° C.

After this step, it was seen that the integrity of the laminated product is not modified. Indeed, the latter may be manipulated without having to change habits in this field. This means that, in spite of a temperature above the degradation or burning temperature of the resin, there remains a sufficient amount of binding material between the sheets forming the laminated product for maintaining them sufficiently together so as to allow handling. In particular, it is possible to machine or to trim the thereby obtained laminated product in order to roughen the adjustment shim, without there being any disintegration. Again, upon use, in order to allow disintegration of the thereby produced adjustment shim, it is sufficient to apply a short blow on a portion of an edge of the adjustment shim, like a simple blow on the corner of a workshop table, in order to initiate disintegration, the stacked sheets of the adjustment shim then forming a fan at the portion of the edge of the shim having received the short blow. Consequently, the operator just has to remove by hand, without any tool, the number of sheets required for obtaining the desired thickness. This allows a simple, rapid, and secured disintegration of the thereby produced adjustment shim.

The method for manufacturing an adjustment shim according to the invention, which has just been described, has the following advantages during the use of the thereby manufactured shim.

It suppresses resorting to the peeling tool.
The disintegration operation becomes instantaneous.
The risk of involuntarily peeling several laminae is suppressed.
The risk of any injury by cutting is suppressed.
The assembly costs are considerably reduced.
The production flows are considerably accelerated.
The peeled metal sheets are reusable if required, since they are not deformed. This allows savings to be made.

Of course, it is possible to provide many modifications to the invention without, however, departing from the scope thereof.

The invention claimed is:

1. A method for manufacturing an adjustment shim comprising:
    preparing a liquid solution comprising a resin and a solvent;
    coating a plurality of metal sheets with the liquid solution and forming a resin film on at least one sheet face of each of the metal sheets;
    stacking the plurality of metal sheets in a stack so that adjacent metal sheets in the stack are separated by the resin film on the sheet face of one of the metal sheets of the adjacent metal sheets; and
    curing the resin films on the sheet faces of the metal sheets in the stack by heating the stack, for a predetermined period of time, at a temperature higher than a temperature of degradation or burning of the resin.

2. The manufacturing method according to claim 1, including, prior to the curing, polymerizing the resin of the resin films.

3. The manufacturing method according to claim 2, including polymerizing the resin of the resin films to a final polymerization state.

4. The manufacturing method according to claim 2, including polymerizing the resin of the resin films at a temperature between 170° C. and 180° C.

5. The manufacturing method according to claim 1, including, in preparing the liquid solution, adding the solvent in a proportion greater than 20% of the liquid solution to disperse the resin and produce a liquid solution providing resin films, on the plurality of metal sheets, having infinitesimal thickness.

6. The manufacturing method according to claim 5, wherein, in preparing the liquid solution, adding the solvent in a proportion of less than or equal to 40% of the liquid solution.

7. The manufacturing method according to claim 1, wherein the resin is a thermosetting resin.

8. The manufacturing method according to claim 1, including roughening the shim after the curing.

9. The manufacturing method according to claim 1, wherein the predefined period of time of curing is three hours.

10. The manufacturing method according to claim 1, wherein
    the resin is an epoxy resin, and
    the temperature of the curing is higher than 260° C.

11. The manufacturing method according to claim 10, wherein the temperature is at least 300° C.

* * * * *